United States Patent [19]

Raimondi et al.

[11] Patent Number: 4,843,213
[45] Date of Patent: Jun. 27, 1989

[54] WELDING AND/OR CUTTING MACHINE

[75] Inventors: Tullio Raimondi; Pierre Presle; Leandro Galbiati, all of Abingdon, England; Stephane de Burbure, Moll, Belgium

[73] Assignee: European Atomic Energy (EURATOM), Plateau du Kirchberg, Luxembourg

[21] Appl. No.: 79,590

[22] Filed: Jul. 30, 1987

[51] Int. Cl.⁴ ............................................. H05B 1/00
[52] U.S. Cl. ............................ 219/159; 219/124.21; 219/124.31; 219/60.2; 104/118; 105/141
[58] Field of Search ........... 219/124.1, 124.21, 124.31, 219/124.03, 124.33, 60.2, 159; 104/118, 242, 243, 244, 245, 247; 105/141

[56] References Cited

U.S. PATENT DOCUMENTS

| | | | |
|---|---|---|---|
| 2,629,002 | 2/1953 | Tinker | 104/118 |
| 2,660,128 | 11/1953 | Hayes | 104/242 |
| 2,671,843 | 3/1954 | Steele | 219/124.03 |
| 3,072,779 | 1/1963 | Masters | 219/124.31 |
| 3,410,982 | 11/1968 | Morris | 219/102 |
| 4,644,129 | 2/1987 | Miller | 219/159 |

FOREIGN PATENT DOCUMENTS 60-91695  5/1985  Japan .

Primary Examiner—E. A. Goldberg
Assistant Examiner—Melissa C. Chiu
Attorney, Agent, or Firm—Plante, Strauss, Vanderburgh

[57] ABSTRACT

A welding and/or cutting machine 1 is provided for use on a workpiece 2 formed by a pair of metal sheets 3 in face to face contact. The machine comprises a movable carriage 4 mounted on a pair of drive rollers 5 operable to grip the sheets 3 of the workpiece in the nip of the rollers. The axes of rotation 6 of the rollers 5 are disposed so that as the rollers rotate, forces are generated which cause the carriage 4 to be pulled on to the workpiece 2. The carriage 4 is capable of transporting welding means 7 as shown in FIG. 1, for lip-welding the sheets of the workpiece together, or, alternatively, transporting cutter means 10 for subsequent removal of weld material.

13 Claims, 5 Drawing Sheets

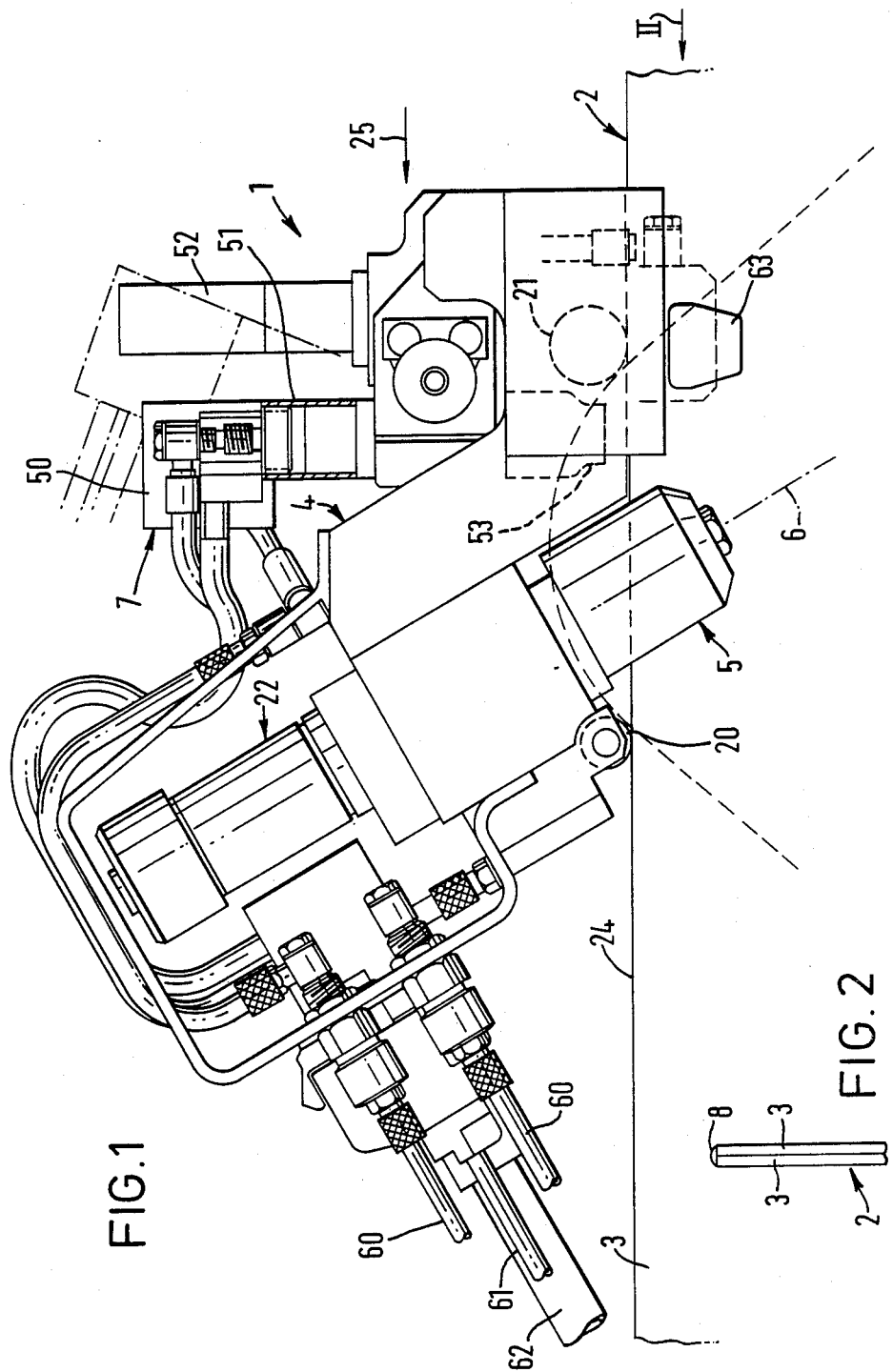

WELDING AND/OR CUTTING MACHINE

BACKGROUND TO THE INVENTION

This invention relates to a welding and/or cutting machine for use on a workpiece formed by a pair of metal sheets in face to face contact.

In a fusion reactor of a particular design, duct ports are provided. The ports comprise openings formed in pairs of metal sheets in face to face contact, with lip-welds securing the adjacent edges of the sheets.

After the reactor has been in use, any cutting away of existing weld material, and then subsequently lip-welding replacement sheets, has to be done at present by remote controlled machines. One machine is used to remove weld material and another to perform the necessary re-welding.

The present invention not only provides a single machine capable of performing both cutting and welding operations; it also provides a machine capable of negotiating curvatures of small radius, (say 60 mm), with the weld lips lying either in a common plane, or on a cylindrical or conical surface of small radius of curvature, (say 100 mm).

SUMMARY OF THE INVENTION

According to the invention, a welding and/or cutting machine for use on a workpiece formed by a pair of metal sheets in face to face contact, comprises a movable carriage mounted on a pair of drive rollers operable to grip the sheets of the workpiece in the nip of the rollers, the axes of rotation of the rollers being disposed so that as the rollers rotate, forces are generated which cause the carriage to be pulled on to the workpiece, the carriage being capable of transporting welding means for lip-welding the sheets of the workpiece together, or, alternatively, cutter means for subsequent removal of weld material.

BRIEF DESCRIPTION OF THE DRAWINGS

An embodiment of the invention will now be described by way of example only with reference to the accompanying drawings, wherein:

FIG. 1 is a side view of a machine according to the invention, incorporating welding means, FIG. 2 is an end view of the workpiece shown in FIG. 1, looked at in the direction of arrow II thereof.

DETAILED DESCRIPTION OF THE PREFERRED EMBODIMENT

Figure 3:
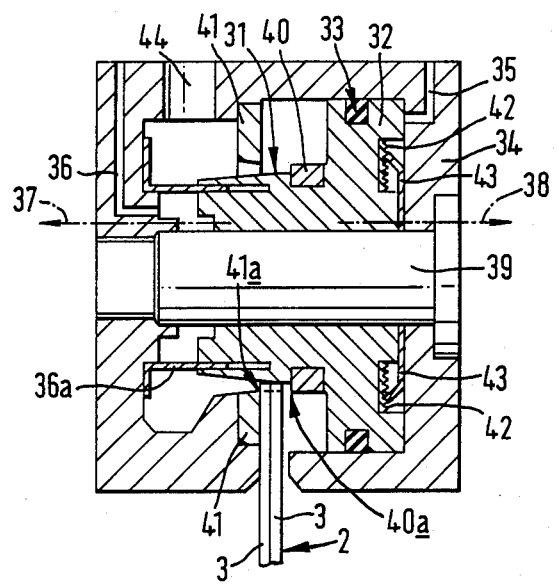
FIG. 3 is a side view, in section, of alternative cutter means for the machine of FIG. 1.

With reference to FIGS. 1 and 2, a remote operated and controlled welding and/or cutting machine 1 for use on a workpiece 2 formed by a pair of metal sheets 3 in face to face contact with each other comprises a movable carriage 4 mounted on a pair of cooperating drive rollers 5 of generally cylindrical form, operable to grip the sheets 3 in the nip of the rollers.

In accordance with the invention, the axes of rotation 6 of the drive rollers 5 are disposed so that, as the rollers rotate, and as explained hereinafter, forces are generated which cause the carriage 4 to be pulled on to the workpiece 2. Arc welding means 7 are mounted on the carriage 4 for lip-welding the sheets 3 together with weld material 8. Alternatively, with reference to FIGS. 3, 4 and 8, cutter means (10) (FIGS. 3 and 8) may be mounted on the carriage 4, for subsequent removal of the weld material.

The workpiece 2 forms an opening in a duct portion of a fusion reactor.

The carriage 4 carries guide rollers 20, 21 disposed respectively at the forward and rearward ends of the carriage and resting on the upper edge of the workpiece 2. The drive rollers 5 are disposed between the rollers 20, 21.

Each of the rollers 5 is driven by a d.c. geared motor unit 22, and are mounted at a substantial "toe-in" angle so that they can negotiate bends of small (say 60 mm) radius while keeping the guide rollers 20, 21 pressed hard against the workpiece 2. To achieve this, and with additional reference to FIG. 7, the axes 6 of the drive rollers 5 are disposed so that each roller driving force (Fs) has a component ($P^1N$) perpendicular to the direction of travel of the machine 1. This applies regardless of whether the machine is travelling in a straight line or negotiating a curve. In FIG. 1, the direction of travel is indicated by the arrow 25; in FIG. 7, it is represented by Va.

Figure 5:
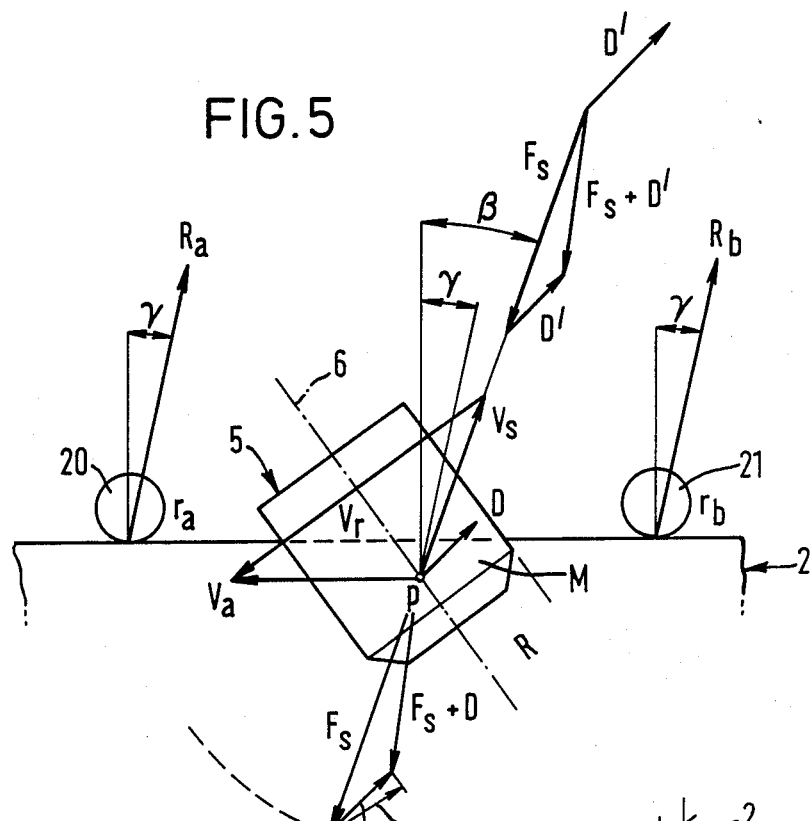
FIGS. 5, 6 and 7 illustrate the action of forces on drive and guide components of the machine.
Figure 6:
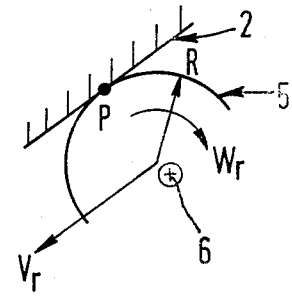

FIG. 5 shows how the rollers 5, 20 and 21 react with the sides and upper edges of the sheets 3 forming the workpiece 2. The illustrated portion of the workpiece 2 has a straight edge 24 against which the rollers 20, 21 bear.

Assuming:

p=application point of a roller 5, comprising the resultant of the contact forces along the generatrix of the roller in contact with the workpiece 2, O=projection of p on the axis 6 of the roller 5, Va=Absolute velocity of O. This is in practice kept at a known value by a velocity servo, Vr=Wr.R=peripheral speed of roller 5, perpendicular to the axis 6 of the roller, Vs=slippage velocity of point p. Vr and Vs can be constructed geometrically with the above information from the triangle of velocities, according to:

$$\bar{V}a = \bar{V}r + \bar{V}s$$

which says that the absolute velocity of O is equal to the sum of the relative velocity of O relative to p, and the slippage velocity of p, Vs.

The friction driving force Fs applied by the workpiece 2 to the carriage at point p is opposite to Vs and of constant amplitude. It can be graphically represented by any of the radii of value Fs of a circle around p, oriented to balance the reactions Ra, Rb of the rollers 20, 21 and the drag force D applied to the motor unit 22 either by the cutter means 10 and associated services or by the welding means 7 and associated services.

$$Fs = -(\bar{R}a + \bar{R}b + \bar{D})$$

or $$Fs + D = -(Ra + Rb)$$

FIG. 5 also shows the resultant vector Fs+D in the case of D containing p, and the vector $Fs + D^1$ when the drag force D is offset from p which is the general case. Ra decreases and Rb increases as $D^1$ is applied further away from point p.

The torque supplied by a roller 5 increases as the component Do of D opposite to Vr increases, since the vector Fs moves clockwise tending to become perpendicular to the roller axis 6. This is a limit condition, however, since the velocity Vr needed to guarantee a given value of Va tends to infinity.

In practice the limit of Do is given by the curve of the torque Tr that can be supplied by a gearbox Vs the speed wr.

Figure 7:
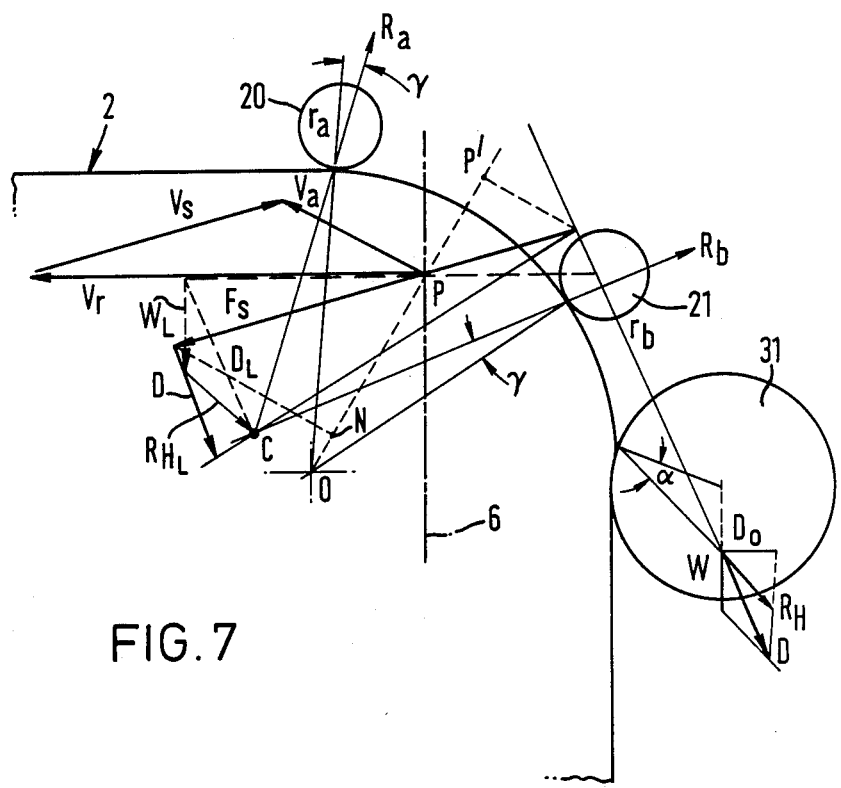

FIG. 7 shows how the apparatus 1 negotiates a curved edge 30 of the workpiece 2, with the cutter means 10 trailing along the uphill stretch, which is the worst case according to experience.

The cutter means 10 is provided with a hub 31 which is kept pressed against the curved edge 30 with a force large enough to keep it there even in the upside down attitude. This force determines a reaction $R_H$ oriented backwards by the angle of friction $\alpha$ to overcome the indentation left by the punch action of the cutter means 10. The resultant of $R_H$ and W is the total drag force D.

Following the above reasoning, the vector Fs summed to D must give a force passing through C in order to balance Ra+Rb. In FIG. 7 the following values exist:
weight of the cutter means 10: W=2 Kg (payload)
total drag force : D=4.6 Kg
friction force required: Fs=16 Kg
Vr=2.5 Va From tests performed, the friction force available is >20 Kg. Hence the above payload is achievable with Vr<2.5 Va.

The theoretical limit of D is when Vr→∞ (or Va→0); in this case $D_L \cong 7$ Kg and $W_L = 3.6$ Kg.

The axes of rotation of the drive rollers 5 are each disposed at an angle whereby the driving force (Fs) has a component ($P^1N$) perpendicular to the direction of travel (Va) of the machine 1. This perpendicular component remains regardless of whether the machine 1 is travelling in a straight line or negotiating a curve.

Figure 4:
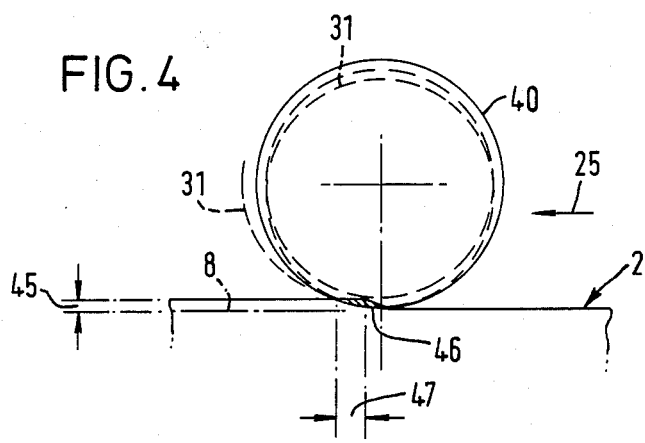
FIG. 4 illustrates hub positions of the cutter means.

With reference to FIGS. 3 and 4, the cutter means 10 comprises a reciprocating punch having a hub 31, referred to above, coupled to a piston 32. The piston 32, which is provided with a sealing ring 33, is slideable within a hydraulic cylinder 34, about a central axis 30. A hydraulic fluid supply line 35 is provided whereby the piston 32 performs a cutting stroke, as indicated by arrow 37. An air line 36 coupled to an air cylinder 36a is provided for the retraction stroke, as indicated by arrow 38. The piston 32 and integral hub 31 are slideable on a shaft 39.

An annular cutter member 40 is mounted on the piston 32 so as to be movable axially therewith. The cutter member 40 has a circular cutting edge 40a, and is movable towards and away from a stationary cutting member in the form of an anvil 41, so as to cut away, by a punch-like action, weld material. The anvil 41, which is of annular form, has a cutting edge 41a.

Figure 3A:
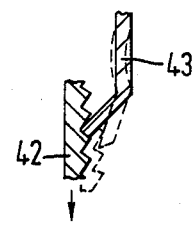
FIG. 3a illustrates two components of the assembly illustrated by FIG. 3, to an enlarged scale.

In order to distribute wear of the cutter member 40 in an even manner, it is made to index around the shaft 39, in an automatic manner, between successive cutting strokes. This is achieved by rotating the cutter member 40 late in its retraction stroke and about the cutter means central axis 30 by means of a ratchet mechanism comprising a saw-toothed member 42 (FIG. 3a) secured to the leading face of the piston 32, and engaging with lamellar springs 43. The springs 43 are mounted on the hydraulic cylinder 34 and are disposed at an angle, (typically 45°) so as to engage with the teeth of the member 42.

Full line illustration of a spring 43 (FIG. 3a) shows the form of the spring as the ratchet mechanism is about to be brought into operation, whereas the dotted line illustration shows the form taken by the spring at the end of the piston retraction stroke.

Distribution of anvil 41 wear may also be achieved by making the anvil rotatable, (manually), about the central axis 30 of the cutter means 10.

Control of the depth of cut 45 (FIG. 4) is obtained by predetermined control of carriage 4 movement between cutting strokes. As the carriage 4 travels along the workpiece 2 in steps, the cutter means 10 operates to cut away crescent-shaped chips 46 of weld material. The chips 46 are sucked away by the application of vacuum, through a port 44.

The carriage 4 is moved forwardly by predetermined amounts 47, referred to herein as steps of motions. As a step of motion occurs, the hub 31 slides gradually, rising along the profile of the cut crescent. The amount of rise affects the depth of cut in the following cutting stroke and increases, within certain limits, by increasing the step of motion. It can be demonstrated that the steady state depth of cut is related to the step motion. This provides a means for controlling the depth of cut without need of sensors. Since the depth control is achieved by using the hub 31 of the cutter means 10, the depth of cut is virtually unaffected by the profile of the joint to be cut, be it straight or radiused. This would not be the case if a sensor displaced from the cutter member 40 was used.

Referring once more to FIG. 1, the welding means 7 comprise a T.I.G. (tungsten insert gas) torch 50, mounted on a pivotable arm 51 which is actuated by a d.c. geared electric motor 52. The torch 50 is provided with a tungsten electrode assembly 53.

The motor 52 is served to the arc voltage so as to keep this voltage constant. The arrangement results in a precise follow-up arrangement accommodating irregularities in contours to be welded as well as variations in radii of curvature. It can also follow the ripple generated by successive chipping away of weld material by the cutter means 10.

The position of the arm pivot is chosen so as to keep the axis of the torch 50 at a substantially constant angle to the workpiece contour to be welded, in both straight line and in turns.

The lateral position of the torch 50 is adjustable. Once set, the torch 50 remains centered to the workpiece joint plane by its proximity to the clamping rollers 5, their "toe-in" angle, and by side rollers 63.

The torch 50 is placed in close proximity to the rollers 5 and between the rollers 5 and the side rollers 63, so that it remains centered to the workpiece joint plane, without need of any other follow-up system to adjust its lateral position.

The machine 1 as illustrated in FIG. 1, is provided with an electrical supply cable 61, a torch gas supply hose 62, and an air supply line 60. The air supply line 60 is used to actuate a piston (not shown) whereby a squeezing force is applied to the weld lips by way of the rollers 5. This force is achieved by mounting one of the rollers 5 on an eccentric cam rotated by a pinion, the teeth of which engage with a rack movable by the piston. The air line 60 also comprises a source of pressurised air for the air line 36. (See FIG. 3).

In use, the machine 1, with the cutter means 10 mounted on the carriage 4 (in FIG. 1 presently occupied by welding means 7), is used to cut away weld material from a workpiece.

Figure 8:
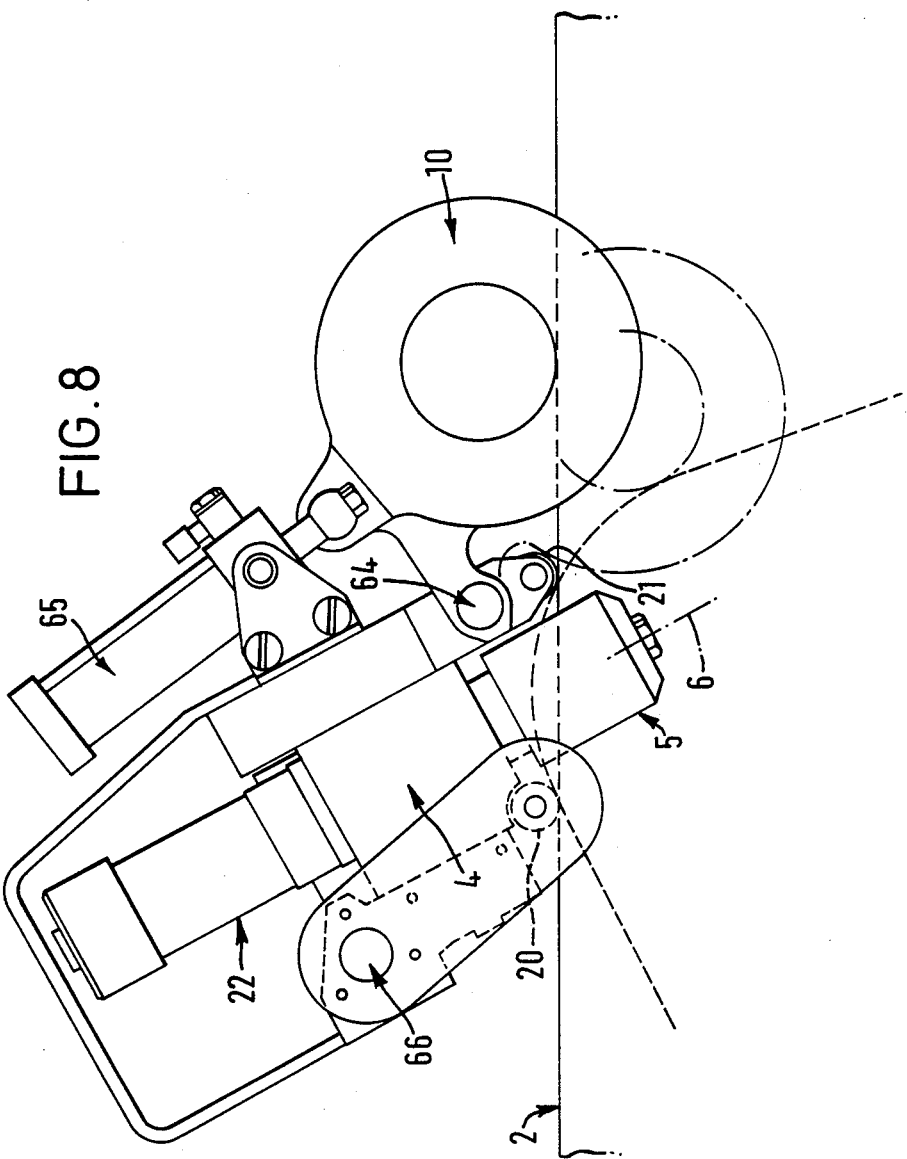
FIG. 8 is a side view of part of the machine, when incorporating the cutter means.

With reference to FIG. 8, the cutter means 10 is hinged about a pivot point 64 at the rear of the carriage 4, and is kept pressed against the workpiece by an air-actuated jack 65 with a force virtually constant. The cutting depth control is achieved by controlling the steps of motion by means of an encoder 66, chain driven by the guide roller 20. These steps vary as the carriage 4 travels around curvatures, but any variations are acceptably small since the radius of curvature is large enough compared to the interaxes between rollers 21 and, respectively, roller 20 and cutter means 10.

After completing the weld-cutting operation, the workpiece is replaced, and the machine, with the cutter means 10 replaced by the welding means 7, is used to lip-weld the new workpiece.

It may be desirable to vary the form of carriage 4, according to whether the machine is to function as a welding machine, or a weld-cutting machine.

We claim:

1. A machine for use on a workpiece formed by a pair of metal sheets in face to face contact, the machine comprising a for travel movement along said work piece and carriage mounted on a pair of cylindrical drive rollers means to drive said rollers, with said rollers being operable to grip the sheets of the workpiece in the nip of the rollers, the axes of rotation of the rollers inclined at an angle to said movement whereby each roller driving force has a force component disposed perpendicular to the direction of travel of the machine so that as the drive rollers rotate, forces are generated which cause the carriage to be pulled on to the workpiece, the carriage being capable of transporting welding means for lip-welding the sheets of the workpiece together, or alternatively, cutter means for subsequent removal of weld material.

2. A machine as claimed in claim 1, wherein guide rollers are provided so as to guide the machine during its travel and so as to react with the workpiece as the carriage is pulled on to the workpiece.

3. A machine for use on a workpiece formed by a pair of metal sheets in face to face contact, the machine comprising a carriage for travel movement along said work piece and mounted on a pair of cylindrical drive rollers means to drive said rollers, with said rollers being operable to grip the sheets of the workpiece in the nip of the rollers, the axes of rotation of the rollers being inclined at an angle to said movement whereby each roller driving force has a force component disposed perpendicular to the direction of travel of the machine so that as the drive rollers rotate, forces are generated which cause the carriage to be pulled on to the workpiece, and cutter means mounted on the carriage for removal of material lip-welding the sheets of said workpiece together.

4. A machine as claimed in claim 3, wherein said cutter means comprise a cutter member movable towards a stationary cutter member.

5. A machine as claimed in claim 3, wherein the cutter means comprise a rotatable cutter member operable by cutting stroke means, said rotatable cutter member being cooperable with a stationary cutter member.

6. A machine as claimed in claim 3, wherein the cutter means comprise a cutter member movable towards a stationary cutter member which can be movable from a normally stationary position, so as to even its wear.

7. A machine as claimed in claim 3, wherein said cutter means is pivotally mounted, means being provided whereby the cutter means can be pressed against the workpiece with a substantially constant force.

8. A machine as claimed in claim 3, operable whereby depth of cut achieved by cutter means is by control of movement of the carriage between cutting strokes of the cutter means.

9. A machine for use on a workpiece formed by a pair of metal sheets in face to face contact, the machine comprising a carriage for travel movement along said work piece and mounted on a pair of cylindrical drive rollers means to drive said rollers, with said rollers being operable to grip the sheets of the workpiece in the nip of the rollers, the axes of rotation of the rollers being inclined at an angle to said movement whereby each roller driving force has a force component disposed perpendicular to the direction of travel of the machine so that as the drive rollers rotate, forces are generated which cause the carriage to be pulled on to the workpiece, and welding means mounted on the carriage for lip-welding the sheets of said workpiece together.

10. A machine as claimed in claim 9, wherein said welding means comprise an electrically-powered welding torch mounted on a pivotable arm actuated by means servo-controlled so as to keep the welding voltage constant.

11. A machine as claimed in claim 10, wherein the pivotable arm is operable so as to maintain the torch at a substantially constant angle to the workpiece.

12. A machine as claimed in claim 3, provided with guide rollers operable so as to guide the machine during its travel and so as to react with the workpiece as the carriage is pulled on to the workpiece.

13. A machine as claimed in claim 11, provided with guide rollers operable so as to guide the machine during its travel and so as to react with the workpiece as the carriage is pulled on to the workpiece.

* * * * *

UNITED STATES PATENT AND TRADEMARK OFFICE
CERTIFICATE OF CORRECTION

PATENT NO. : 4,843,213

DATED : June 27, 1989

INVENTOR(S) : Tullio Raimondi et al

It is certified that error appears in the above-identified patent and that said Letters Patent is hereby corrected as shown below:

Claim 1, column 5, line 28, after "comprising a" insert --carriage--

Claim 1, column 5, line 29, delete "carriage"

Signed and Sealed this

Tenth Day of April, 1990

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,843,213

DATED : June 27, 1989

INVENTOR(S) : Tullio Raimondi et al

It is certified that error appears in the above-identified patent and that said Letters Patent is hereby corrected as shown below:

On the title page:

Add the following priority claim;

EPO Application No. 8630638.1 filed August 18, 1986

Signed and Sealed this

Fourth Day of September, 1990

*Attest:*

HARRY F. MANBECK, JR.

*Attesting Officer*　　　　　*Commissioner of Patents and Trademarks*